Figures 1, 2:
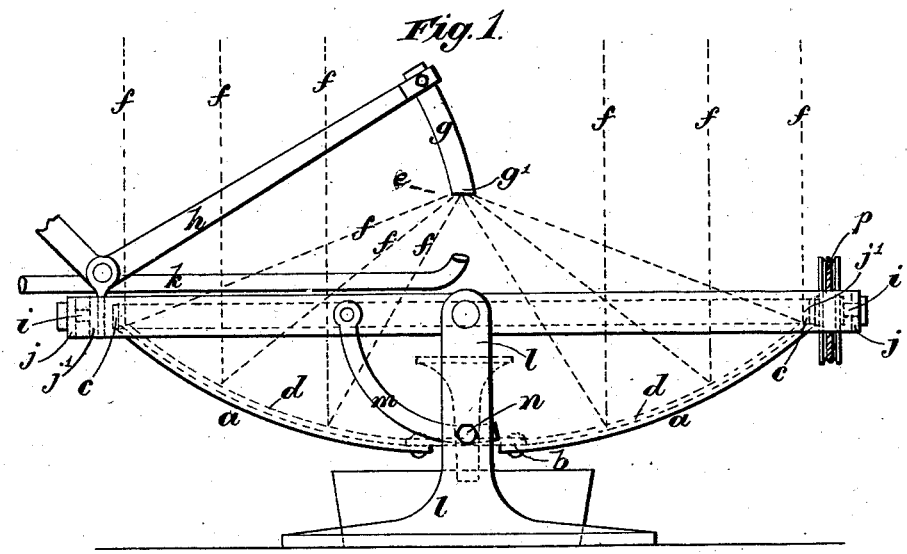

(No Model.)

J. CLARK.
METHOD OF REDUCING METALS FROM THEIR ORES.

No. 277,884. Patented May 22, 1883.

Witnesses.
Robert Everett.
George Tilghman.

Inventor.
John Clark.
By W. H. Babcock
Atty.

UNITED STATES PATENT OFFICE.

JOHN CLARK, OF SILCHESTER ROAD, KENSINGTON, COUNTY OF MIDDLESEX, ENGLAND.

METHOD OF REDUCING METALS FROM THEIR ORES.

SPECIFICATION forming part of Letters Patent No. 277,884, dated May 22, 1883.

Application filed January 26, 1883. (No model.)

*To all whom it may concern:*

Be it known that I, JOHN CLARK, a subject of the Queen of Great Britain, residing at Silchester Road, Kensington, in the county of Middlesex, England, metallurgist, have invented new and useful Improvements in Reducing Certain Metals from their Ores, more particularly the oxides and chlorides of the more refractory ores; and I do hereby declare that the following specification, taken in connection with the accompanying drawings, forming a part of the same, is a full, clear, and exact description thereof.

The object of this invention is to obtain the intense heat necessary for reducing the more refractory metallic ores—such as the oxides and chlorides of aluminium, magnesium, calcium, and platinum—by apparatus consisting of a large and powerful reflecting-mirror for concentrating the rays of the sun, by which an intense heat, approaching the heat of the oxyhydrogen blow-pipe, is attained, and which is capable, with suitable reagents brought at the same time to bear upon the incandescent focus, to reduce such refractory metallic ores, or those that are not economically reduced by the highest heat of a wind-furnace with the combustion of carbon therein.

The usual practice in reducing the oxides of aluminium and magnesium is very costly, and consists in first converting the oxide into a chloride, and afterward by an expensive process to reduce the chloride by fusing metallic sodium or potassium therewith, which, owing to their great affinity for chlorine, reduces the other metal. This invention reduces these oxides and chlorides without the costly reagents hitherto employed.

I now proceed to describe the apparatus whereby I carry my said invention into practice.

Figure 1 is an elevation, and Fig. 2 is a plan thereof, having similar letters for corresponding parts.

$a$ are radiated arms or brackets, bolted to the cental ring or hoop, $b$, and to the outside hoop, $c$. To the arms $a$ is fixed the reflecting-mirror, consisting of segments $d$, of silvered glass or burnished metal sheets, which may be plated with silver, nickel, or other suitable metal. They are bent so that the sun's rays falling thereon shall be reflected to a focus at $e$, as shown by the dotted lines $f$. In the focus $e$, I expose the ore $g$ to be reduced, which I prefer to prepare in the form of a bar or block. I fix such bar to the arm $h$, by which it is moved into the focus $e$ as required, and is moved forward as the end $g'$ gets reduced or melted off. The oxides and chlorides of the metals under treatment I carefully pulverize, and then by powerful compression consolidate them into bars or blocks, as described. When I have heated the ore in the focus $e$, I blow a suitable reducing reagent thereon; but I prefer such reagent in a gaseous form—such as hydrogen, carbureted hydrogen, or carbonic oxide—which reagent I convey through the pipe $k$, which is connected with a tank or reservoir holding such reagent, and blow it upon the incandescent ore in the focus $e$, whereby I effect its reduction in a direct and more economical manner than hitherto. When I use a solid reagent—such as carbon or carbonaceous matter—I intimately mix such reagent with the ore before compressing the same into blocks, as described, and at the same time I blow a neutral gas—such as nitrogen or carbonic acid—through the pipe $k$ to prevent the reoxidation of the metal after its reduction. When I blow the gaseous reagent through the pipe $k$ the excess of the reagent, surrounding the reducing-focus, usually prevents the reoxidation of the metal; but to prevent such a result still further, in some cases I inclose the whole apparatus in a chamber with a glass roof, and fill the said chamber with the reducing-gas. The chlorides of the metals referred to are reduced by my apparatus, as described, without the usual costly reagents employed, as sodium or potassium. In the case of reducing the oxide or chloride of platinum it is not necessary to blow a reagent through the pipe $k$, as these are both reduced by the action of heat alone. The intense heat of the focus $e$ is also required to concentrate and consolidate the metal so produced, to prepare it economically for after-welding in the usual manner.

In order to give my apparatus continuity of action throughout the day, to follow the sun in his diurnal course, and also to enable the apparatus to be set in line with his elevation, as determined by the latitude and season of the year, I suspend my apparatus by gimbals $i$ in the concentric rings $j\ j'$. The outer ring, $j$, is supported upon suitable brackets, $l$, and to this ring is fixed the radial arm $m$, sliding in in a slot and secured in place by the nut $n$, by which the position of the reflecting-mirror to suit the elevation of the sun is adjusted. To give the reflecting-mirror a movement suiting the sun's diurnal motion, I fix a pulley, $o$, on the axis of the inner ring, $j'$, and pass a line, $p$, around the pulley $o$. I connect the line $p$ to a train of clock-work, by which a regular and progressive motion is imparted to such mirror for the purpose required. When I arrange several such mirrors together I connect the line $p$ of each, so as to work the series simultaneously. The arm $h$ and the pipe $k$ are attached to the ring $j'$ and move with it.

In another application, numbered 83,099, I have described and shown a lens provided with devices for presenting it to the sun in all positions of the latter during its diurnal journey, and with devices for holding ores in the focus of said lens for the purpose of reducing them; I therefore do not claim herein the subject-matter of said application.

Having thus particularly described my said invention and the means whereby it may be carried into effect, what I claim as novel, and desire to secure by Letters Patent, is—

1. The process of reducing metals from their ores, consisting in exposing them to the rays of the sun concentrated by a large concave mirror, and applying to them suitable reagents, substantially as set forth.

2. A set of segments or plates forming a concave reflector, in combination with rings which hold them together, and slotted arms $m$, which are made adjustable on their brackets or supports in order that the inclination of the reflector may correspond to the position of the sun, and means for holding ore in the focus, substantially as set forth.

3. A mirror or reflector, $a$, provided with a frame and supporting and adjusting devices adapting it to follow the course of the sun, in combination with a pipe, $k$, which supplies reagents to the focus of said mirror, and an arm, $h$, which is adapted to hold in said focus a bar of the metal to be reduced, said tube and arm being attached to the frame of said mirror in order that they may move therewith, substantially as set forth.

In testimony whereof I affix my signature in the presence of two witnesses.

JOHN CLARK.

Witnesses:
WILLIAM COOKE,
JOSEPH LOW.